US012356434B2

(12) United States Patent
Prasad et al.

(10) Patent No.: US 12,356,434 B2
(45) Date of Patent: Jul. 8, 2025

(54) FREQUENCY DOMAIN RESOURCE ALLOCATION FOR MULTICAST TRAFFIC

(71) Applicant: Nokia Technologies Oy, Espoo (FI)

(72) Inventors: Athul Prasad, Naperville, IL (US); David Bhatoolaul, Swindon (GB); David Navrátil, Espoo (FI); Naizheng Zheng, Beijing (CN); Ugur Baran Elmali, Munich (DE); Volker Pauli, Munich (DE)

(73) Assignee: Nokia Technologies Oy, Espoo (FI)

( * ) Notice: Subject to any disclaimer, the term of this patent is extended or adjusted under 35 U.S.C. 154(b) by 150 days.

(21) Appl. No.: 18/247,967

(22) PCT Filed: Oct. 22, 2020

(86) PCT No.: PCT/CN2020/122987
§ 371 (c)(1),
(2) Date: Apr. 5, 2023

(87) PCT Pub. No.: WO2022/082661
PCT Pub. Date: Apr. 28, 2022

(65) Prior Publication Data
US 2023/0413295 A1 Dec. 21, 2023

(51) Int. Cl.
*H04W 72/30* (2023.01)
*H04W 72/0453* (2023.01)
*H04W 72/23* (2023.01)

(52) U.S. Cl.
CPC ....... *H04W 72/30* (2023.01); *H04W 72/0453* (2013.01); *H04W 72/23* (2023.01)

(58) Field of Classification Search
CPC . H04W 72/30; H04W 72/0453; H04W 72/23; H04W 72/044; H04W 4/06; H04W 72/042; H04W 72/1268; H04L 27/2613
See application file for complete search history.

(56) References Cited

U.S. PATENT DOCUMENTS 10,693,620 B2    6/2020   Zhou et al.
11,758,529 B2 *  9/2023   Zhou ................. H04W 72/30
                                                370/329
(Continued)

FOREIGN PATENT DOCUMENTS

CN    101060473 A    10/2007
CN    103988559 A     8/2014
(Continued)

OTHER PUBLICATIONS

Office Action for Japanese Application No. 2023-524881 dated May 20, 2024 and English translation.
(Continued)

*Primary Examiner* — Brian T O Connor
(74) *Attorney, Agent, or Firm* — Nokia Technologies Oy

(57) ABSTRACT

Embodiments of the present disclosure relate to frequency domain resource allocation for multicast traffic. A method comprises: receiving, at a first device and from a core network element, multicast traffic to be scheduled for a second device; generating assistance information for the second device, the assistance information enabling the second device to identify, within a bandwidth part configured for the second device, a frequency domain resource allocated for the multicast traffic; and transmitting the assistance information to the second device. The method further comprises: receiving, at the second device, the assistance information from a first device; and determining the frequency domain resource from downlink control information based on the assistance information. In this way, a significant flexibility to schedule multicast traffic can be provided, and a significant complexity reduction to a terminal device can be provided.

7 Claims, 12 Drawing Sheets

(56) References Cited

U.S. PATENT DOCUMENTS

| | | | |
|---|---|---|---|
| 12,069,545 B2* | 8/2024 | Kim | H04L 1/1896 |
| 12,200,739 B2* | 1/2025 | Chen | H04W 4/06 |
| 2009/0022064 A1 | 1/2009 | Oron et al. | |
| 2014/0355493 A1* | 12/2014 | Niu | H04L 12/189 |
| | | | 370/312 |
| 2018/0183551 A1 | 6/2018 | Chou et al. | |
| 2018/0287750 A1 | 10/2018 | Abdoli et al. | |
| 2019/0044811 A1 | 2/2019 | Miao et al. | |
| 2019/0132855 A1 | 5/2019 | Lee et al. | |
| 2020/0021419 A1 | 1/2020 | Taherzadeh Boroujeni et al. | |
| 2020/0112941 A1 | 4/2020 | Yerramalli et al. | |
| 2020/0235898 A1 | 7/2020 | Loehr et al. | |
| 2020/0267511 A1* | 8/2020 | Abdoli | H04L 5/001 |
| 2020/0280474 A1 | 9/2020 | Babaei et al. | |
| 2021/0112531 A1* | 4/2021 | Shen | H04W 76/11 |
| 2021/0250918 A1* | 8/2021 | Liu | H04L 5/0053 |

FOREIGN PATENT DOCUMENTS

| | | |
|---|---|---|
| CN | 108810972 A | 11/2018 |
| CN | 110401922 A | 11/2019 |
| CN | 111491373 A | 8/2020 |
| JP | 2020-123944 A | 8/2020 |
| KR | 20190111704 A | 10/2019 |
| WO | 2020/000309 A1 | 1/2020 |
| WO | 2020/124373 A1 | 6/2020 |
| WO | 2020/194464 A1 | 10/2020 |

OTHER PUBLICATIONS

Office Communication for European Application No. 20 958 243.6 dated Jul. 8, 2024.

"3rd Generation Partnership Project; Technical Specification Group Radio Access Network; NR; NR and NG-RAN Overall Description: Stage 2 (Release 16)", 3GPP TS 38.300, V16.2.0, Jul. 2020, pp. 1-148.

"WID revision: NR Multicast and Broadcast Services", 3GPP TSG RAN Meeting #88-e, RP-201038, Agenda: 9.10.8. Huawei, Jun. 29-Jul. 3, 2020, 6 pages.

Alepuz et al., "LTE-Advanced Pro Broadcast Radio Access Network Benchmark", 5G-Xcast, Broadcast and Multicast Communication Enablers for the Fifth-Generation of Wireless Systems, Deliverable D3.1, Version 1.1, Jun. 29, 2018, 140 pages.

"Discussion on PDCCH monitoring reduction during DRX active time", 3GPP TSG RAN WG1 #102-e, R1-2006223, Agenda: 8.7.2, CMCC, Aug. 17-28, 2020, 3 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; NR; Physical channels and modulation (Release 16)", 3GPP TS 38.211, V16.2.0, Jun. 2020, pp. 1-131.

"3rd Generation Partnership Project; Technical Specification Group Radio Access Network; NR; Physical layer procedures for data (Release 16)", 3GPP TS 38.214, V16.2.0, Jun. 2020, pp. 1-163.

"3rd Generation Partnership Project; Technical Specification Group Radio Access Network; NR; Physical layer procedures for control (Release 16)", 3GPP TS 38.213, V16.2.0, Jun. 2020, pp. 1-176.

"Draft Report of 3GPP TSG RAN WG1 #102-e v0.2.0", 3GPP TSG RAN WG1 Meeting #103-e, R1-200xxxx, MCC Support, Oct. 26-Nov. 13, 2020, pp. 1-199.

Abinader et al., "Impact of Bandwidth Part (BWP) Switching on 5G NR System Performance", IEEE 2nd 5G World Forum (5GWF), Sep. 30-Oct. 2, 2019, pp. 1-6.

International Search Report and Written Opinion received for corresponding Patent Cooperation Treaty Application No. PCT/CN2020/122987, dated Jun. 23, 2021, 9 pages.

Extended European Search Report received for corresponding European Patent Application No. 20958243.6, dated Sep. 25, 2023, 15 pages.

"Discussion on group scheduling mechanisms in NR MBS", 3GPP TSG RAN WG1 #102-e, R1-2006233, Agenda: 8.12.1, CMCC, Aug. 17-28, 2020, 9 pages.

"Resource configuration and group scheduling for RRC_Connected UEs", 3GPP TSG RAN WG1 Meeting #102-e, R1-2005249, Agenda: 8.12.1, Huawei, Aug. 17-28, 2020, 5 pages.

Office action received for corresponding Chinese Patent Application No. 202080106576.X, dated Jan. 27, 2025, 10 pages of office action and 6 pages of translation available.

Office action received for corresponding European Patent Application No. 20958243.6, dated Jan. 31, 2025, 15 pages.

\* cited by examiner

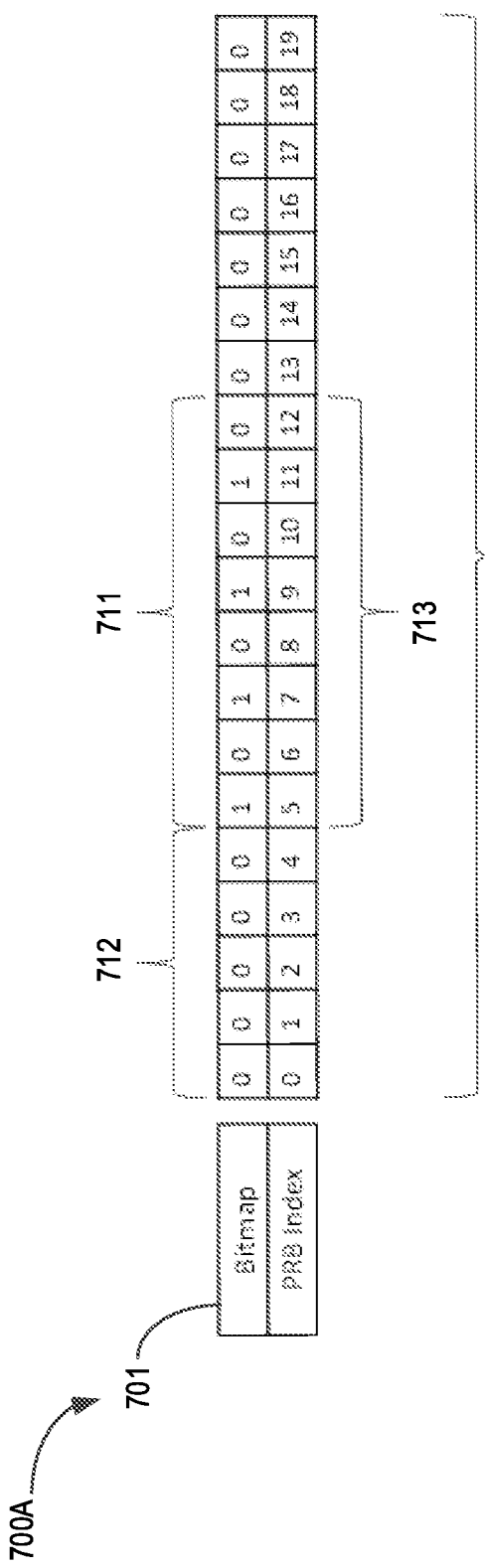
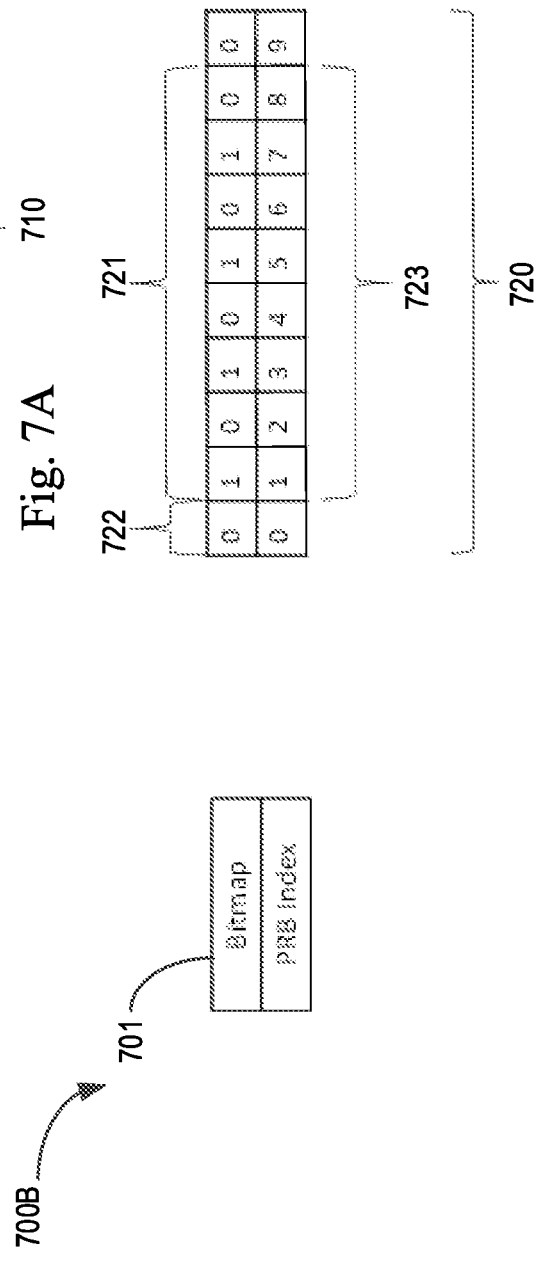
Fig. 7A
Fig. 7B

FREQUENCY DOMAIN RESOURCE ALLOCATION FOR MULTICAST TRAFFIC

RELATED APPLICATION

This application claims priority to PCT Application No. PCT/CN2020/122987, filed on Oct. 22, 2020, which is incorporated herein by reference in its entirety.

FIELD

Embodiments of the present disclosure generally relate to the field of telecommunication and in particular, to a method, device and computer readable storage medium of communication for optimizing frequency domain resource allocation for multicast traffic.

BACKGROUND

With development of a new radio (NR) multicast technology, third generation partnership project (3GPP) is currently defining mechanisms for enabling the delivery of multicast traffic and/or broadcast traffic to a multitude of terminal devices. One key aim is to define group scheduling mechanisms that enable the multicast traffic and/or broadcast traffic to be scheduled using common data channel resources, while maintaining maximum commonalities with the currently defined unicast scheduling and operation mechanisms.

Currently, enhancements on the group scheduling mechanisms have been mainly related to downlink data traffic scheduling and related radio resource optimizations. There are also various solutions related to reliability improvement techniques. However, there has been limited attention provided to control channel enhancements, especially in terms of signaling. Specifically, control signaling enhancements for frequency domain resource allocation information to a group of users, which could be interpreted differently by individual users or terminal devices within the group depending on their own unique bandwidth configurations have not been considered before.

SUMMARY

In general, example embodiments of the present disclosure provide a solution for optimizing frequency domain resource allocation for multicast traffic.

In a first aspect, there is provided a first device. The first device comprises: at least one processor; and at least one memory including computer program code; the at least one memory and the computer program code are configured to, with the at least one processor, cause the first device to: receive, from a core network element, multicast traffic to be scheduled for a second device; generate assistance information for the second device, the assistance information enabling the second device to identify, within a bandwidth part configured for the second device, a frequency domain resource allocated for the multicast traffic; and transmit the assistance information to the second device.

In a second aspect, there is provided a second device. The second device comprises: at least one processor; and at least one memory including computer program code; the at least one memory and the computer program code are configured to, with the at least one processor, cause the second device to: receive assistance information from a first device, the assistance information enabling the second device to identify, within a bandwidth part configured for the second device, a frequency domain resource allocated for multicast traffic; and determine the frequency domain resource from downlink control information based on the assistance information, the downlink control information received from the first device and comprising a field indicating the frequency domain resource.

In a third aspect, there is provided a method of communication. The method comprises: receiving, at a first device and from a core network element, multicast traffic to be scheduled for a second device; generating assistance information for the second device, the assistance information enabling the second device to identify, within a bandwidth part configured for the second device, a frequency domain resource allocated for the multicast traffic; and transmitting the assistance information to the second device.

In a fourth aspect, there is provided a method of communication. The method comprises: receiving, at a second device, assistance information from a first device, the assistance information enabling the second device to identify, within a bandwidth part configured for the second device, a frequency domain resource allocated for multicast traffic; and determining the frequency domain resource from downlink control information based on the assistance information, the downlink control information received from the first device and comprising a field indicating the frequency domain resource.

In a fifth aspect, there is provided an apparatus of communication. The apparatus comprises: means for receiving, at a first device and from a core network element, multicast traffic to be scheduled for a second device; means for generating assistance information for the second device, the assistance information enabling the second device to identify, within a bandwidth part configured for the second device, a frequency domain resource allocated for the multicast traffic; and means for transmitting the assistance information to the second device.

In a sixth aspect, there is provided an apparatus of communication. The apparatus comprises: means for receiving, at a second device, assistance information from a first device, the assistance information enabling the second device to identify, within a bandwidth part configured for the second device, a frequency domain resource allocated for multicast traffic; and means for determining the frequency domain resource from downlink control information based on the assistance information, the downlink control information received from the first device and comprising a field indicating the frequency domain resource.

In a seventh aspect, there is provided a non-transitory computer readable medium. The non-transitory computer readable medium comprises program instructions for causing an apparatus to perform the method according to the third aspect.

In an eighth aspect, there is provided a non-transitory computer readable medium. The non-transitory computer readable medium comprises program instructions for causing an apparatus to perform the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 7A illustrates a diagram of an example determination of a frequency domain resource for multicast traffic for resource allocation (RA) Type-0 according to some embodiments of the present disclosure;

FIG. 7B illustrates a diagram of another example determination of a frequency domain resource for multicast traffic for resource allocation (RA) Type-0 according to some embodiments of the present disclosure;

Throughout the drawings, the same or similar reference numerals represent the same or similar element.

DETAILED DESCRIPTION

Figure 1:
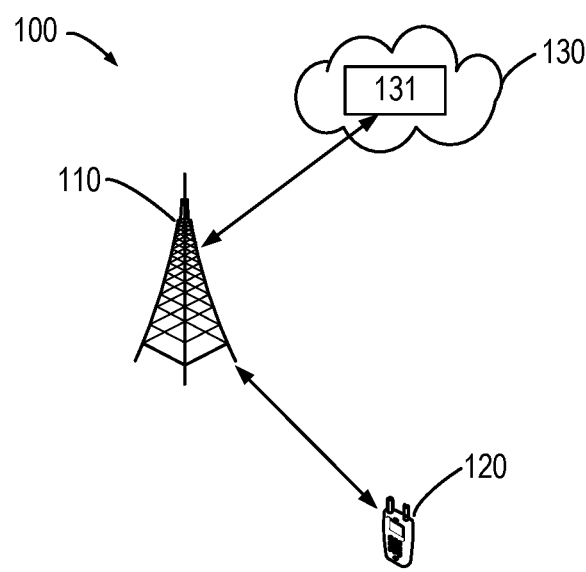
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standard, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocol, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a Mobile Terminal (MT), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

The term "multicast traffic" as used herein implies traffic delivered to a group of users interested in receiving the traffic, and also implies data that is sent over the air and received by all users interested in receiving the traffic. In other words, the multicast traffic as used herein may also cover both multicast and broadcast services. In the following description, the terms "multicast traffic", "multicast service", "broadcast traffic", "broadcast service" and "multicast/broadcast service (MBS)" may be used interchangeably.

In 4G, the group scheduling mechanisms were enabled using semi-static or dynamic broadcast signaling of control information which pointed to semi-static or dynamic shared data channel resources for evolved multicast broadcast multimedia service (eMBMS) and single-cell point-to-multipoint (SC-PTM). For eMBMS and SC-PTM, due to the support for receive-only mode terminal devices, there were lot of limitations imposed on the system design, such as the support for devices that are not registered with the network, support for idle mode devices, etc., which had significant impact in terms of how the multicast data/traffic channel (MTCH) and multicast control channel (MCCH) information was sent using the physical channel—using physical downlink shared channel (PDSCH) or physical multicast channel (PMCH).

Here, the main focus for 5G NR is on RRC_Connected mode terminal devices, which is a significant departure from previous generations and also enables unique enhancements that would help with the optimal delivery of multicast traffic and/or broadcast traffic. Multicast traffic implies traffic delivered to a group of users interested in receiving the traffic, and broadcast traffic implies data that is sent over the air and received by all users interested in receiving the traffic. The enhancements currently being discussed have been mainly related to downlink data traffic scheduling and related radio resource optimizations. There are also various proposals related to reliability improvement techniques. However, there has been limited attention provided to control channel enhancements, especially in terms of signaling. While certain methods may be described herein with reference to connected mode terminal devices, it will be understood that such methods may similarly be applied to terminal devices in other modes as well.

The considerations so far in 5G in the context of shared data channel resources suggest either the use of currently defined BWP concept where the terminal devices are configured with a set of resources within the system bandwidth where the network device would be scheduling the multicast PDSCH resources, or the use of a multicast broadcast service (MBS) specific dedicated bandwidth part. In this case, it is foreseen that a frequency domain resource allocation (FDRA) field within downlink control information (DCI) requires enhancement.

In view of this, embodiments of the present disclosure provide a solution for such enhancement. In the solution, assistance information is signaled from a first device providing a multicast traffic to a second device receiving the multicast traffic, so as to enable the second device to identify from a group-common PDCCH message the group-common frequency resources configured for the multicast traffic, while the BWP configuration is specific to the second device. In this way, a significant flexibility to schedule multicast traffic can be provided, and unicast and multicast traffic for a terminal device can be scheduled within the same slot. Further, a significant complexity reduction to a terminal device can be provided. Principles and implementations of the present disclosure will be described in detail below with reference to the figures. Although reference is made herein to multicast traffic, it will be understood that multicast traffic may imply broadcast traffic, and that the same principles and implementations may also be applied to broadcast traffic.

FIG. 1 illustrates an example communication network 100 in which embodiments of the present disclosure can be implemented. As shown in FIG. 1, the network 100 includes a first device 110 and a second device 120 served by the first device 110. The network 100 also includes a core network 130, and the core network 130 includes a core network element 131. It is to be understood that the number of the first and second devices and that of the core network element as shown in FIG. 1 are only for the purpose of illustration without suggesting any limitations. The network 100 may include any suitable number of first and second devices and core network elements adapted for implementing embodiments of the present disclosure. In some embodiments, the first device 110 may be a network device, and the second device 120 may be a terminal device. In some embodiments, the core network element 131 may be a server providing multicast traffic.

Merely for illustration purposes and without suggesting any limitations as to the scope of the present disclosure, some embodiments will be described in the context where the first device 110 is a network device and the second device 120 is a terminal device. It is to be understood that, in other embodiments, the first device 110 may be a terminal device and the second device 120 may be a network device. In other words, the principles and spirit of the present disclosure can be applied to both uplink and downlink transmissions.

As shown in FIG. 1, the first device 110 and the second device 120 may communicate with each other, and the second device 120 may communicate with the core network element 131 via the first device 110. The communications within the network 100 may conform to any suitable standard including, but not limited to, LTE, LTE-evolution, LTE-advanced (LTE-A), wideband code division multiple access (WCDMA), code division multiple access (CDMA) and global system for mobile communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In some scenarios, the first device 110 may receive, from the core network element 131, multicast traffic to be scheduled for a plurality of second devices. For convenience, the following description is made by taking the second device 120 as an example. The first device 110 may schedule a frequency domain resource for the multicast traffic and indicate the frequency domain resource to the second device 120. Accordingly, the second device 120 may receive the multicast traffic from the frequency domain resource. In some embodiments, the first device 110 may determine the frequency domain resource from a set of frequency resources (also referred to as common frequency resources herein) used for scheduling of the multicast traffic.

In some embodiments, the first device 110 may configure a BWP configuration to the second device 120. Generally, four BWPs can be configured both in uplink and downlink, and each BWP indicates a set of frequency resources within a carrier bandwidth. Each BWP has commonalities in terms of the numerology used, along with a contiguous set of physical resource blocks (PRBs). In some embodiments, the second device 120 may have only one active BWP, with BWP-0 considered to be the initial BWP. In some embodiments, the second device 120 may also be configured with a default BWP, to which the second device 120 falls back after the active BWP has been inactive for a configured period of time.

Figure 2:
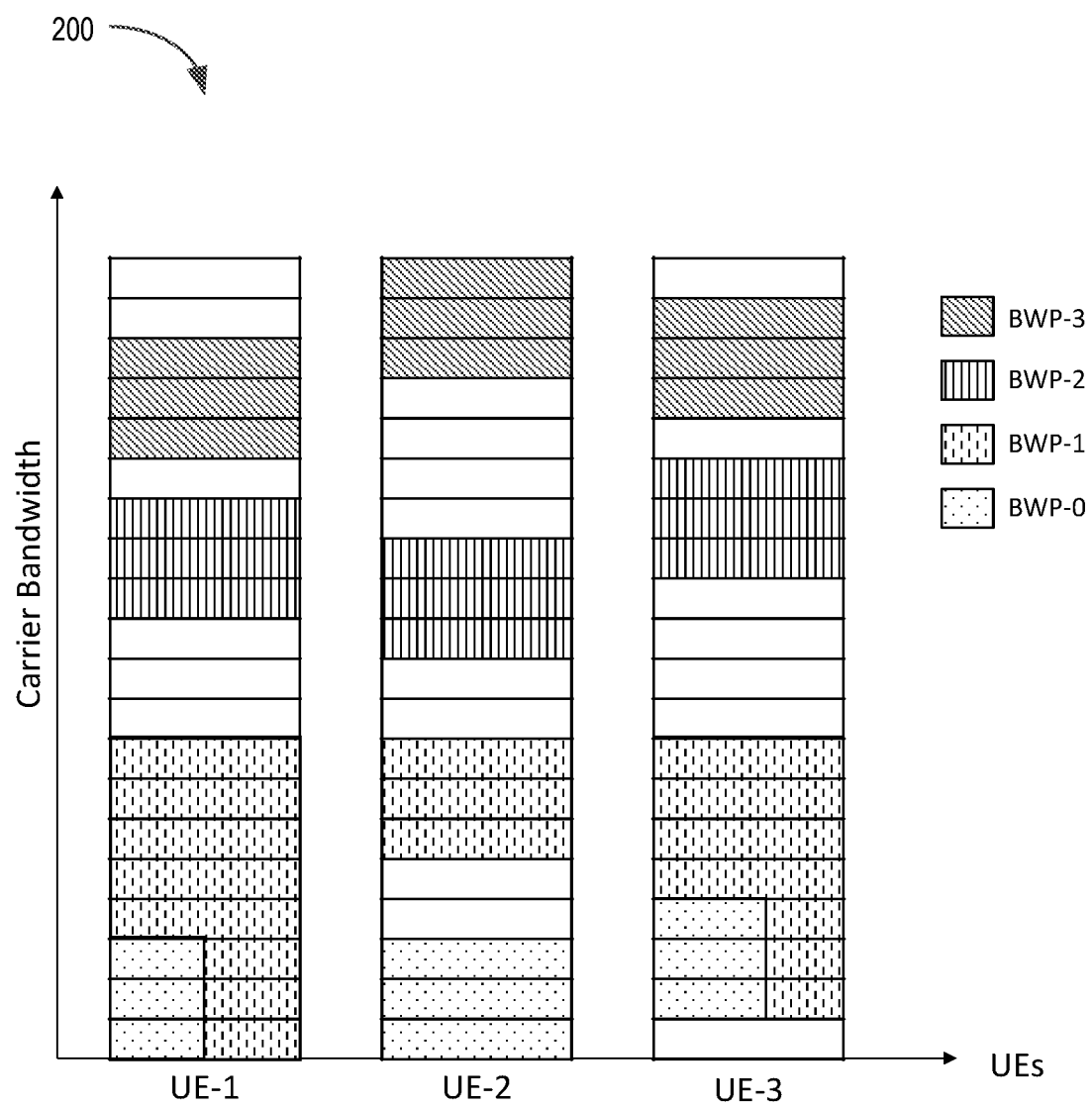
FIG. 2 illustrates a diagram of an example bandwidth part (BWP) configuration.

FIG. 2 illustrates a diagram 200 of an example BWP configuration. In the example of FIG. 2, three different terminal devices UE-1, UE-2 and UE-3 are considered and each configured with four BWPs, i.e., BWP-0, BWP-1, BWP-2 and BWP-3, where each block in FIG. 2 could be considered as a PRB. Here, depending on the requirements of the traffic being scheduled for each individual terminal device, based on the overall load of the cell, and various other factors, the terminal device 120 may switch between different BWPs. The BWP configurations in terms of location in the frequency/carrier bandwidth, subcarrier spacing, inactivity timers, etc., may be configured using a higher layer signaling such as radio resource control (RRC) signaling.

In some embodiments, the second device 120 may be asked to switch BWPs based on at least one of the following configurations:
 By PDCCH (i.e, downlink control information (DCI)) signaling from the first device 110: A specific BWP can be activated by Bandwidth part indicator in DCI Format 0_1 (a UL Grant) and DCI Format 1_1 (a DL Schedule)
 By the bwp-InactivityTimer: ServingCellConfig.bwp-InactivityTimer configured by the first device 110
 By RRC signaling from the first device 110
 By the MAC entity itself upon initiation of Random Access procedure by the second device 120.

In some embodiments, DCI (formats 1_0 or 1_1) may be used by the first device 110 to schedule the PDSCH resources. The key fields within the DCI which is utilized for this purpose are the frequency domain resource allocation (FDRA) field, as denoted by 310 or 320 in FIG. 3 described later. It informs the second device 120 about the PDSCH PRBs within certain slots and consists of information that is relevant to the second device 120. This information corresponds to resources within the second device 120's active BWP.

In some embodiments, DCI Format 1_1 may also be used by the first device 110 to request the second device 120 to switch the active BWP to another BWP where the resources are scheduled for the second device 120. There are various other means of BWP switching as discussed earlier, which could be used by the first device 110 to switch the active BWP of the second device 120 to the appropriate BWP, for e.g., where the MBS PRBs are going to be scheduled.

In some embodiments, the first device 110 may deliver DCI for the plurality of second devices receiving the same multicast traffic using group-radio network temporary identity (G-RNTI) which is configured using higher layer signaling such as RRC signaling.

Figure 3:
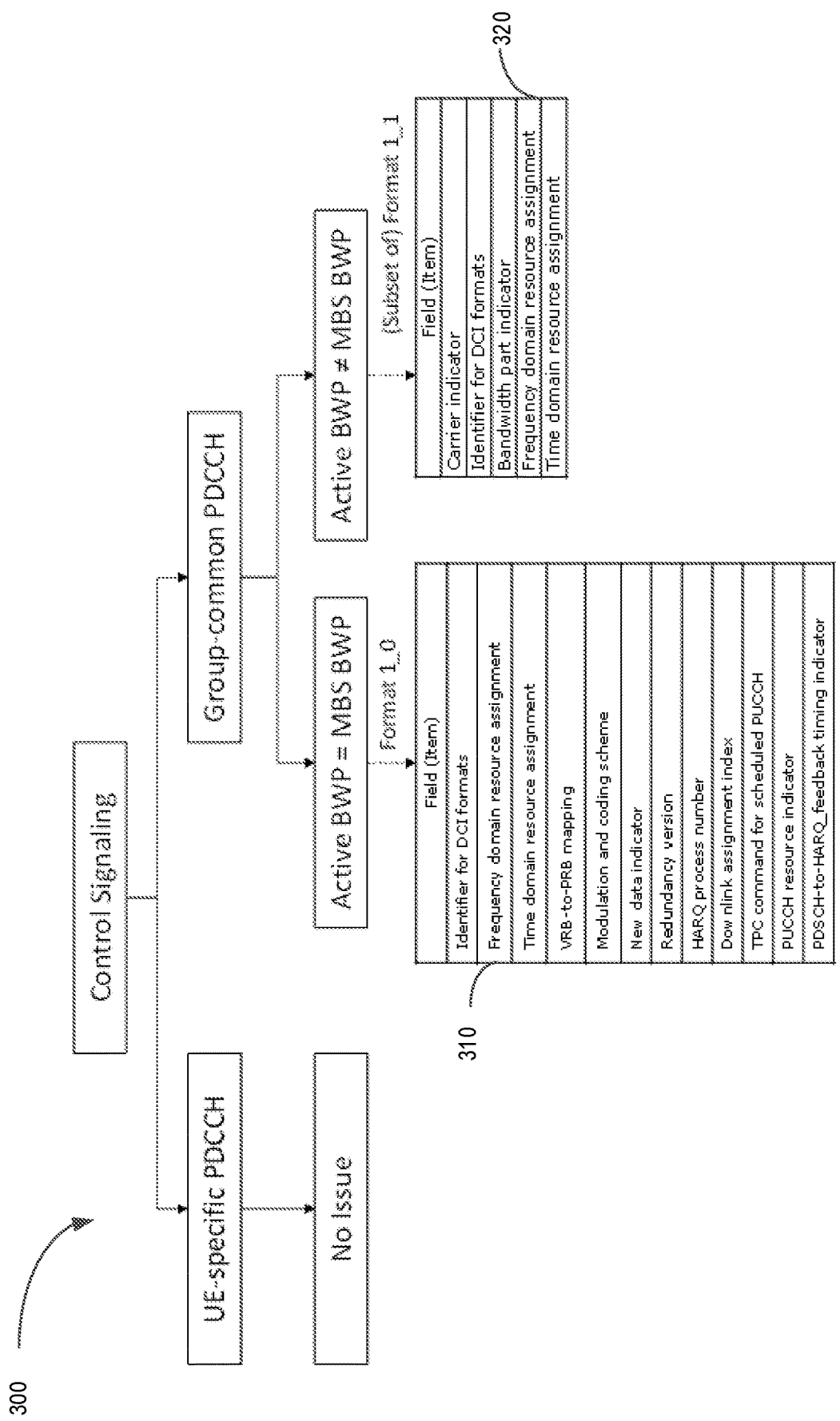
FIG. 3 illustrates a diagram of control signaling scenarios considered for NR multicast.

Due to the immense amount of flexibility offered by the 5G system, there are various options for the control signaling using PDCCH to convey the common frequency resources/MBS PDSCH, that are summarized in FIG. 3. FIG. 3 illustrates a diagram 300 of control signaling scenarios considered for NR multicast. This could be done using the UE-specific signaling of PDCCH/DCI using existing formats for downlink scheduling. If this option is utilized, there would be no issues foreseen related to BWP and related FDRA.

However, as shown in FIG. 3, in case of group-common PDCCH signaling where a DCI (possibly using modified format 1_x) scrambled using G-RNTI is utilized for scheduling common frequency resources/MBS PDSCH, there are problems related to both BWP and FDRA configurations. This will be detailed in connection with FIGS. 4 and 5A-5B.

Figure 4:
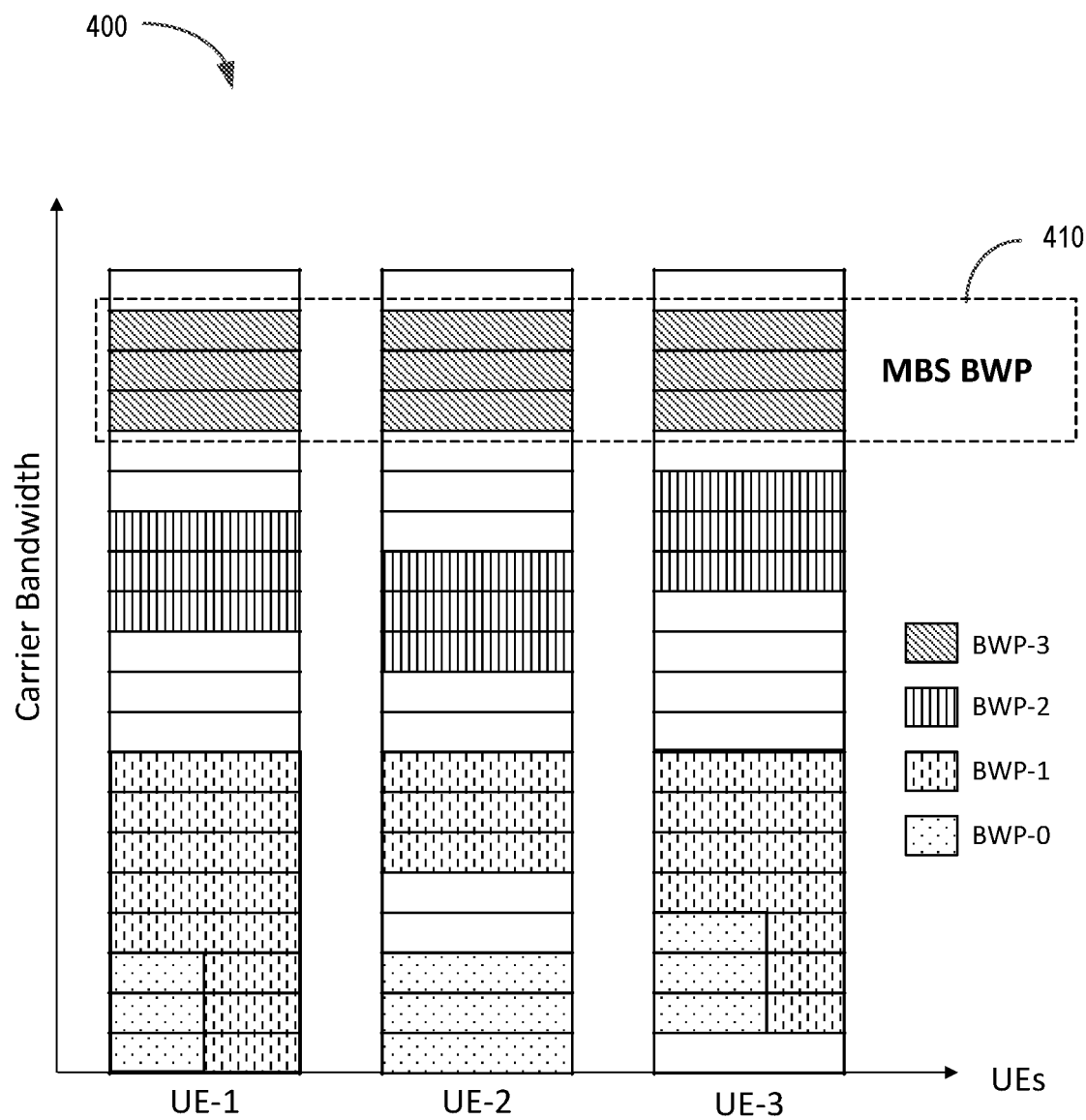
FIG. 4 illustrates a diagram of a straightforward BWP configuration for scheduling multicast traffic according to conventional solutions.

FIG. 4 illustrates a diagram 400 of a straightforward BWP configuration for scheduling multicast traffic according to conventional solutions. As shown in FIG. 4, all the terminal devices UE-1, UE-2 and UE-3 receiving the multicast traffic are assumed to be configured with identical BWPs— which are dedicated to MBS traffic, with the exact same BWP ID, as denoted by 410. In this scenario, as long as all the terminal devices are able to switch to BWP-3 at the appropriate time instant when MBS PDSCH is being scheduled, there would be no issues foreseen with the BWP and FDRA configurations within the DCI.

However, this solution is not realistic considering the agreements within 3GPP related to the simultaneous scheduling of unicast and multicast traffic within the same slot, since the straightforward solution would provide significant constraints on the scheduling at a network device and depending on the uncorrelated unicast traffic received by the terminal devices, having symmetric BWP configurations is simply impractical. In addition to designing identical BWPs, configuring the same BWP ID for them at each terminal device brings even more restrictions. Considering the fact that the terminal devices can join and leave multicast groups at any point of time, such a solution involves significant complexity in terms of configuring and reconfiguring the MBS BWP to a multitude of terminal devices using higher layer signaling such as RRC signaling. Another important factor to be considered is that the terminal devices could receive a multitude of multicast traffic flows, each of which could be received over different common MBS frequency resources, potentially configured over different BWPs. All of these constraints would make the straightforward solution impractical.

Figure 5A:
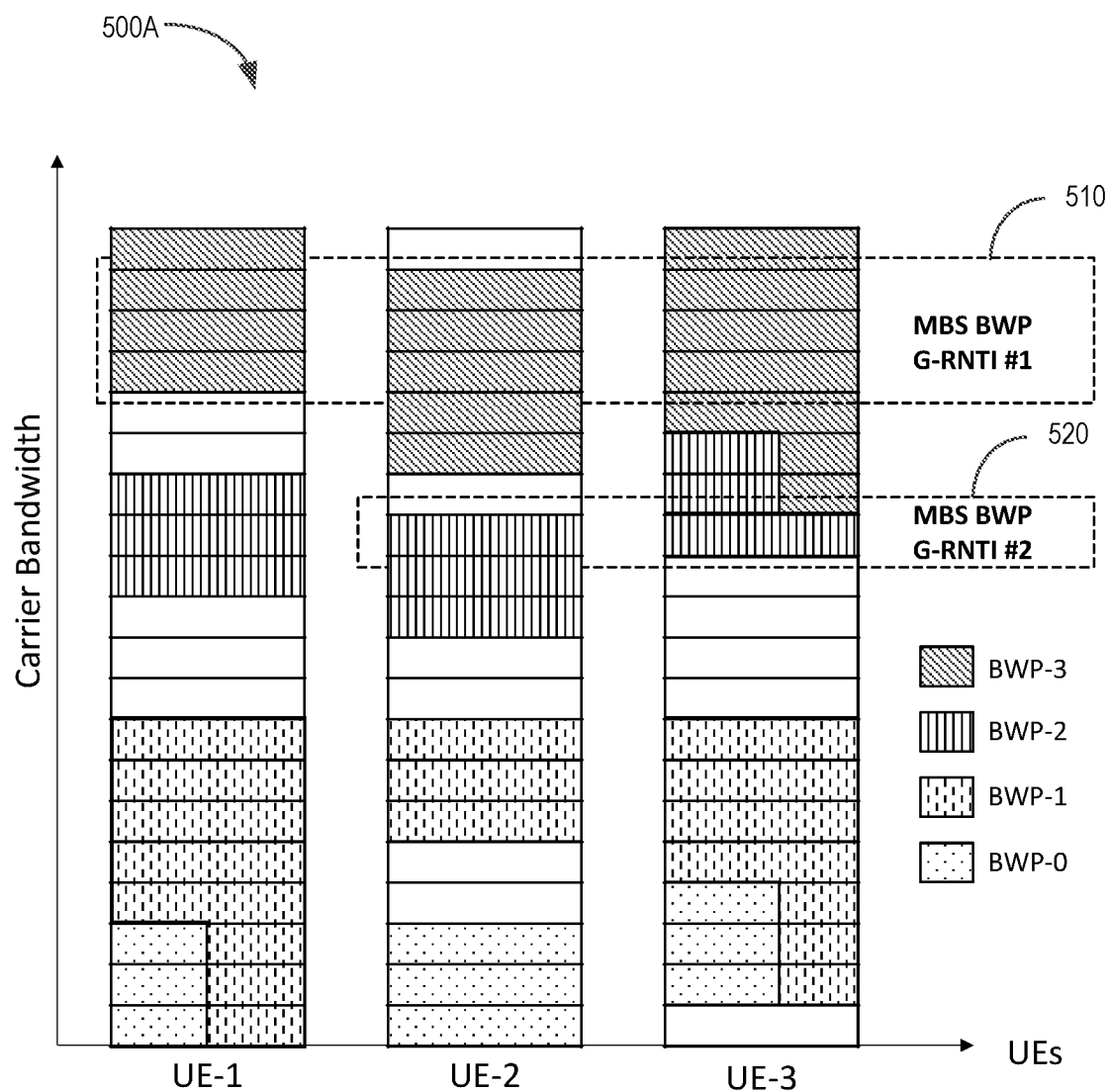
FIG. 5A illustrates a diagram of a flexible BWP configuration for scheduling multicast traffic according to conventional solutions.

In some other conventional solutions, some considerations are made to necessitate the need for the network device to have maximum flexibility in terms of UE-specific/dedicated BWP configurations, in order to schedule the traffic in the most efficient manner. FIG. 5A illustrates a diagram 500A of a flexible BWP configuration for scheduling multicast traffic according to conventional solutions. This example considers the scheduling of MBS traffic using common resources within the same BWP ID, as well as the scenario where different groups of terminal devices are receiving different MBS traffic. As shown in FIG. 5A, the terminal devices UE-1, UE-2 and UE-3 may be configured with the same MBS BWP (BWP-3) for MBS traffic corresponding to G-RNTI #1, as denoted by 510. The terminal devices UE-2 and UE-3 may be configured with the same MBS BWP (BWP-2) for another MBS traffic corresponding to G-RNTI #2, as denoted by 520.

Figure 5B:
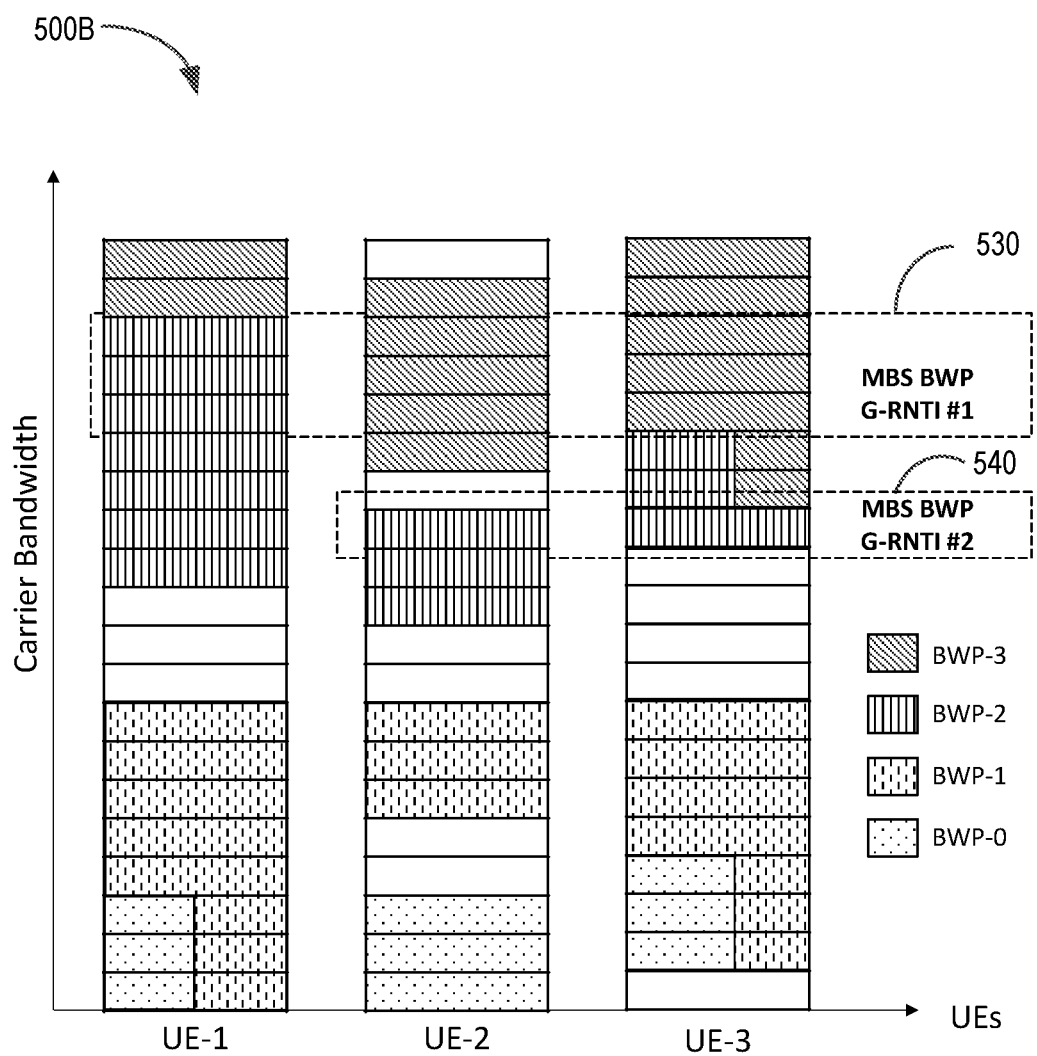
FIG. 5B illustrates a diagram of another flexible BWP configuration for scheduling multicast traffic according to conventional solutions.

FIG. 5B illustrates a diagram 500B of another flexible BWP configuration for scheduling multicast traffic according to conventional solutions. This example considers the scheduling of MBS traffic using common resources within the same or different BWP IDs, as well as the scenario where different groups of terminal devices are receiving different MBS traffic. As shown in FIG. 5B, the terminal devices UE-1, UE-2 and UE-3 may be configured with different MBS BWPs (BWP-2 for UE-1 and BWP-3 for UE-2 and UE-3) for MBS traffic corresponding to G-RNTI #1, as denoted by 530. The terminal devices UE-2 and UE-3 may be configured with the same MBS BWP (BWP-2) for another MBS traffic corresponding to G-RNTI #2, as denoted by 540.

However, it is still to be studied how to signal this information, especially related to common frequency resources utilized for the delivery of multicast traffic, in the most efficient manner so that the terminal devices are able to receive the multicast traffic they are interested in receiving. Here, assuming that the control resource set (CORESET) where PDCCH is scheduled is within the MBS BWP, and thus within the common frequency resources. Here, MBS BWP implies (a) the common frequency resources where a particular multicast or broadcast traffic is scheduled; or (b) the bandwidth part where all the multicast or broadcast traffic is scheduled for a terminal device. Options (a) and (b) mainly differ in terms of where the PDCCH resources for scheduling multicast or broadcast traffic is located in a common location or confined within the common frequency resources for each individual multicast or broadcast traffic.

In view of the above, embodiments of the present disclosure provide a mechanism for signaling assistance information (also referred to as additional parameters herein) from the first device 110 providing a multicast service to the second device 120 receiving the multicast service, where the assistance information is utilized by the second device 120 to identify from a group-common PDCCH message the group-common frequency resources/MBS PDSCH resources configured for the scheduling of multicast traffic, while bandwidth part configurations might be specific to the second device 120. This mechanism of the present disclosure is illustrated in a high-level flowchart as shown in FIG. 6.

Figure 6:
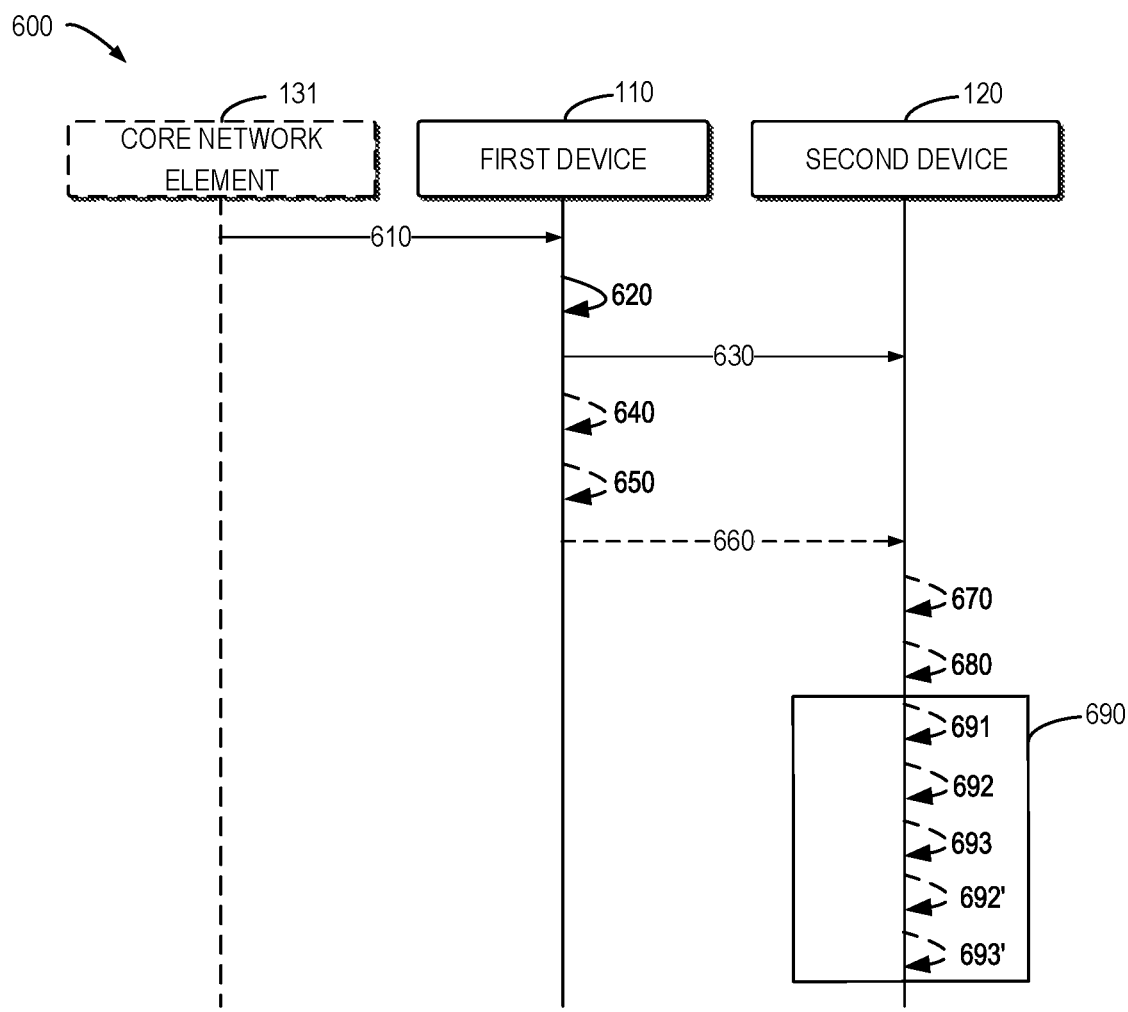
FIG. 6 illustrates a flowchart illustrating a process of communication according to some embodiments of the present disclosure.

FIG. 6 illustrates a flowchart illustrating a process 600 of communication according to some embodiments of the present disclosure. For convenience, FIG. 6 will be described in connection with the example of FIG. 1.

As shown in FIG. 6, the first device 110 receives 610, from the core network element 131, multicast traffic to be scheduled for the second device 120. Upon receipt of the multicast traffic, the first device 110 generates 620 assistance information. The assistance information enables the second device 120 to identify, within a BWP configured for the second device 120, a frequency domain resource allocated for the multicast traffic.

In some embodiments, the assistance information may comprise an identity (also referred to as BWP ID herein) of the BWP in which the frequency domain resource is scheduled. In some embodiments, the BWP may be a currently active BWP of the second device 120. In some embodiments, the BWP may be another BWP different from the active BWP. In this case, the second device 120 may switch from the active BWP to the other BWP.

In some embodiments, the assistance information may comprise an offset (also referred to as a frequency resource offset (FRO) herein) indicating a starting location of the frequency domain resource within the BWP. In some embodiments, the assistance information may comprise a parameter (also referred to as a BWP size adaptation parameter ($BWP_{SA}$) herein) for adaptation of a size of a BWP of the multicast traffic relative to a size of the BWP configured for the second device 120. In some embodiments, FRO and $BWP_{SA}$ may be optional parameters that are signaled to the second device 120, depending on the resource allocation (RA) type (Type 0 or Type 1) utilized or configured for the multicast traffic or for the second device 120.

It is to be understood that these are merely examples for the assistance information, and the assistance information may comprise other suitable information enabling the second device 120 to identify the frequency domain resource allocated for the multicast traffic within the BWP configured for the second device 120.

With the assistance information, significant flexibility to the first device 110 to schedule MBS PDSCH can be provided by combining the best aspects of BWP size dedicated for the second device 120 and common frequency resources for multicast traffic. Further, the first device 110 is allowed to schedule unicast and multicast traffic for the second device 120 within the same slot by enabling flexible BWP configuration dedicated for the second device 120.

In some embodiments, the assistance information may be associated with an identifier associated with the multicast traffic. For example, the identifier may be a common group identifier such as the G-RNTI for the multicast traffic. In this case, there may be one-to-one mapping between the G-RNTI and the assistance information. In other words, the assistance information may be configured per multicast service, and may be limited in its validity to an individual multicast service. In this way, different assistance information may be provided for different multicast service, and scheduling of a frequency domain resource for multicast traffic can be achieved in a more flexible way.

Upon generation of the assistance information, the first device 110 transmits 630 the assistance information to the second device 120. In some embodiments, the assistance information may be transmitted along with the G-RNTI configuration. In some embodiments, the first device 110 may transmit the assistance information via a higher layer signaling such as a RRC signaling. It will be understood that other suitable means for exchanging the assistance information are also feasible.

In some embodiments, the first device 110 may generate 640 DCI comprising a field (also referred to as a FDRA field herein) indicating the frequency domain resource. For example, the DCI may be in Format 1_0 and may comprise the FDRA field 310 in FIG. 3. As another example, the DCI may be in Format 1_1 and may comprise the FDRA field 320 in FIG. 3. It is to be understood that other suitable forms are also feasible for the DCI.

In some embodiments, the first device 110 may determine or select the frequency domain resource from common frequency resources used for scheduling of the multicast traffic.

In some embodiments, the first device 110 may scramble 650 the DCI with the identifier associated with the multicast traffic. For example, the first device 110 may perform cyclic redundancy check (CRC) scrambling for the DCI with the G-RNTI. Then, the first device 110 may transmit 660 the scrambled DCI to the second device 120.

Accordingly, the second device 120 receives the assistance information and also receives the DCI from the first device 110. In some embodiments, the second device 120 may receive, from a downlink control channel, scrambled DCI with an identifier associated with the multicast traffic. For example, the second device 120 may receive, from a PDCCH, scrambled DCI with G-RNTI corresponding to the multicast traffic. Then the second device 120 may determine the DCI by descrambling the scrambled DCI.

In some embodiments, the second device 120 may determine 670 a size of the FDRA field in the DCI based on $BWP_{SA}$ in the assistance information. Then the second device 120 may obtain or decode 680 the field from the DCI based on the size of the field. This process may be called DCI size estimation. This is done to ensure that all the second devices which may have different BWPs configured are synchronized in terms of the possible DCI size. In this way, simplified blind decoding can be achieved.

The second device 120 determines 690 the frequency domain resource from the FDRA field in the DCI based on the assistance information. In some embodiments, the second device 120 may determine the respective assistance information corresponding to the G-RNTI. In this way, different multicast service may be provided with different assistance information, and frequency domain resource allocation for multicast traffic can be achieved in a more flexible way.

Upon determination of the FDRA field, the second device 120 may determine 691 the RA type configured for the second device 120. In some embodiments, the RA type may be Type-0 where the FDRA field comprises a bitmap. FIG. 7A illustrates a diagram 700A of an example determination of a frequency domain resource for multicast traffic for resource allocation (RA) Type-0 according to some embodiments of the present disclosure and FIG. 7B illustrates a diagram 700B of another example determination of a frequency domain resource for multicast traffic for resource allocation (RA) Type-0 according to some embodiments of the present disclosure. The FDRA field 701 as shown in FIGS. 7A and 7B is of RA Type-0, and is in a form of a bitmap. In this example, the bitmap field '1' indicates that the corresponding PRB would be scheduled with data and '0' indicates that the corresponding PRB would not be scheduled with data. Of course, in some embodiments, the bitmap field '1' may indicate that the corresponding PRB would not be scheduled with data and '0' indicates that the corresponding PRB would be scheduled with data.

Figure 8A:
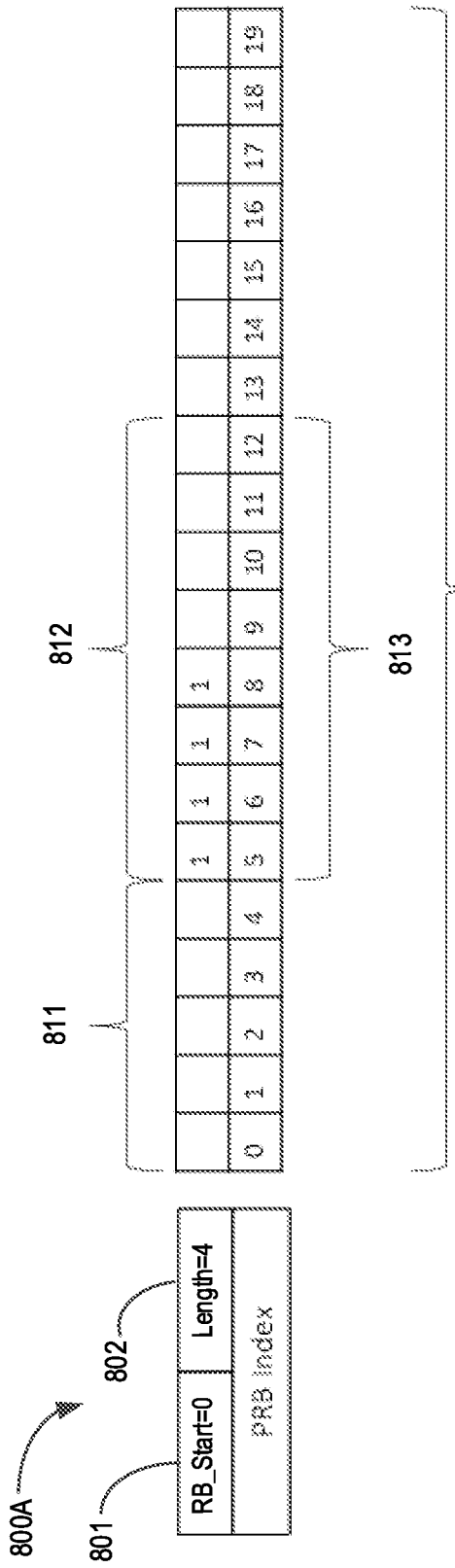
FIG. 8A illustrates a diagram of an example determination of a frequency domain resource for multicast traffic for RA Type-1 according to some embodiments of the present disclosure.
Figure 8B:
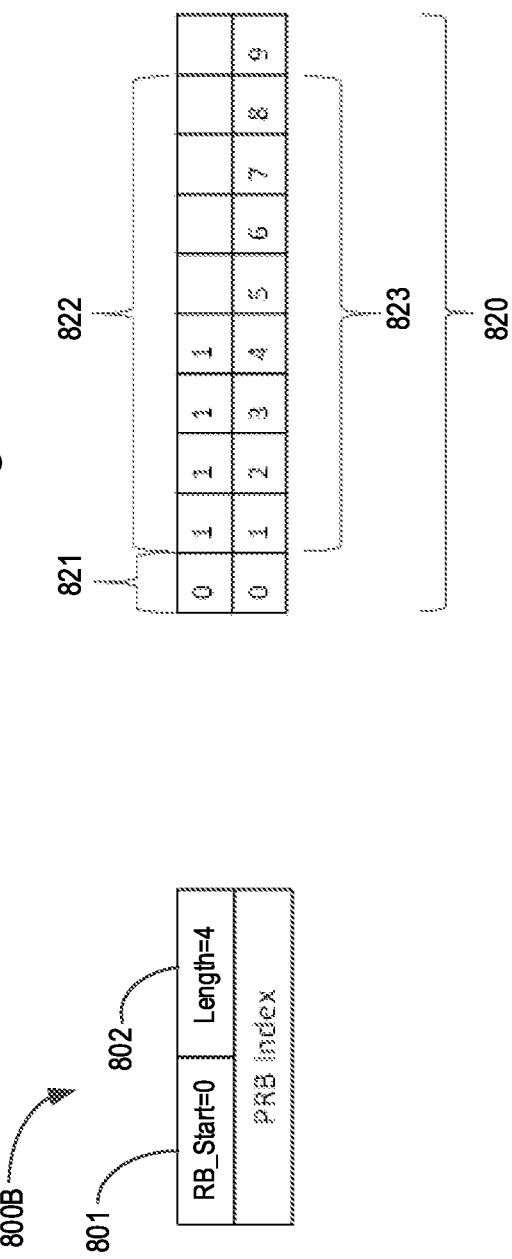
FIG. 8B illustrates a diagram of an example determination of a frequency domain resource for multicast traffic for RA Type-1 according to some embodiments of the present disclosure.

In some embodiments, the RA type may be Type-1 where the FDRA field comprises index information of a starting resource block (RB) (also referred to as RB_Start herein) and the number of RBs (also referred to as Length herein). In some embodiments, the index information may be an index of the starting RB. In some embodiments, the index information may be a resource indicator value which the second device 120 may use to determine the starting RB. In this case, the index of the starting RB may be determined based on the resource indicator value. The index of the starting RB indicates a PRB from which the data is to be scheduled, and the number of RBs indicates the size of the data transmission in terms of the size of the RBs where the data the second device 120 is interested in receiving would be scheduled. FIG. 8A illustrates a diagram 800A of an example determination of a frequency domain resource for multicast traffic for Type-1 according to some embodiments of the present disclosure and FIG. 8B illustrates a diagram 800B of another example determination of a frequency domain resource for multicast traffic for Type-1 according to some embodiments of the present disclosure. The FDRA field as shown in FIGS. 8A and 8B is of RA Type-1 and comprises two portions, i.e., a RB_Start 801 and a length 802.

In some embodiments, if determining that the FDRA field comprises a bitmap, i.e., the FDRA field is of RA Type-0, FRO may be utilized to calculate the relative position of the bitmap configuration in the FDRA field within the active BWP of the second device 120. The $BWP_{SA}$ may be of the same size as the FDRA field and indicates the size of common frequency resources for the group-common PDSCH.

In some embodiments, the second device 120 may expand 692 the FDRA field so that a size of the FDRA field is equal to that of the BWP configured for the second device 120 by padding the beginning and ending of the FDRA field with a bit (also referred to as a first bit herein) indicating that no data is scheduled. Assuming that the first bit is "0". Of course, other suitable bits are also feasible. In some embodiments, the second device 120 may pad the beginning of the FDRA field with a first number of the first bit, where the first number=FRO. In this case, the second device 120 may pad the ending of the FDRA field with a second number of the first bit, where the second number=the size of the BWP−FRO−$BWP_{SA}$.

For illustration, some examples are described in connection with FIGS. 7A and 7B. In these examples, two different UE-1 and UE-2 which are receiving the multicast traffic over common frequency resources are considered. For UE-1, these common frequency resources are part of BWP-1, and for UE-2, these common frequency resources are part of BWP-2. Total sizes of the BWP-1 and BWP-2 are different for UE-1 and UE-2.

In the example of FIG. 7A, the size of BWP is 20 as denoted by 710, FRO=5 and $BWP_{SA}$=8. The FDRA field obtained from the DCI is denoted by 711. The size of the FDRA field 711=$BWP_{SA}$=8. The beginning of the FDRA field 711 is padded with "0" bits of size=FRO=5, as denoted by 712, and the ending of the FDRA field 711 is padded with "0" bits of size=the size of BWP−FRO−$BWP_{SA}$=20-5-8=7.

In the example of FIG. 7B, the size of BWP is 10 as denoted by 720, FRO=1 and $BWP_{SA}$=8. The FDRA field obtained from the DCI is denoted by 721. The size of the FDRA field 721=$BWP_{SA}$=8. The beginning of the FDRA field 721 is padded with "0" bits of size=FRO=1, as denoted by 722, and the ending of the FDRA field 721 is padded with "0" bits of size=the size of BWP−FRO−$BWP_{SA}$=10-1-8=1.

It can be seen from FIGS. 7A and 7B that despite the total sizes of the BWP-1 and BWP-2 are different for UE-1 and UE-2, both UE-1 and UE-2 are able to successfully identify the appropriate PRBs where the group-common MBS data is scheduled using the assistance information. The bitmap configuration is common for UE-1 and UE-2, and with the assistance information, both UE-1 and UE-2 are able to determine the PRB indexes where the data is expected to be scheduled.

Based on the expanded field, the second device 120 may identify 693 the frequency domain resource scheduled for the multicast traffic within the BWP configured for the second device 120, as shown by 713 in FIG. 7A and 723 in FIG. 7B.

In some embodiments, if determining that the FDRA field comprises index information of a starting RB and the number of RBs, i.e., the FDRA field is of RA Type-1, the second device 120 may determine 692' a resource indicator value (RIV) based on the index information, the number of RBs and the assistance information. In some embodiments, the second device 120 may obtain further index information (also referred to as RB_Start_Actual herein) based on the index information of the starting RB and the FRO. For example, RB_Start_Actual=FRO+RB_Start. In some embodiments, the index information in the group-common DCI always may be 0 (i.e., RB_Start=0). Here, the number of RBs≤$BWP_{SA}$. In this case, $BWP_{SA}$ may be not configured in the assistance information. In some embodiments, if RB_Start+Length=the size of the BWP, $BWP_{SA}$ may be omitted.

In some embodiments, the second device 120 may determine a RIV based on the further index information, $BWP_{SA}$ and the number of RBs. For example, with assumption that the size of BWP is $BWP_{SA}$ and the index of a starting RB is RB_Start_Actual, the RIV may be determined by the following formulas (1) and (2):

if$(L_{RBs}-1) \leq \lfloor N_{BWP}^{size}/2 \rfloor$ then $$RIV=N_{BWP}^{size}(L_{RBs}-1)+RB_{start} \qquad (1)$$

else $$RIV=N_{BWP}^{size}(N_{BWP}^{size}-L_{RBs}+1)+(N_{BWP}^{size}-1-RB_{start}) \qquad (2)$$

where $L_{RBs}$ denotes the number of RBs, $RB_{start}$ denotes an index of a starting RB, and $N_{BWP}^{size}$ denotes the size of BWP. $L_{RBs} \geq 1$ and shall not exceed BWP start and $N_{BWP}^{size}$=$BWP_{SA}$, and $RB_{start}$=RB_Start_Actual.

It is to be understood that the above equations are merely an example, and other suitable ways are also feasible to calculate RIV. Based on the RIV, the second device 120 may determine 693' the frequency domain resource scheduled for the multicast traffic within the BWP configured for the second device 120.

For illustration, some examples are described in connection with FIGS. 8A and 8B. In these examples, two different UE-1 and UE-2 which are receiving the multicast traffic over common frequency resources are considered. For UE-1, these common frequency resources are part of BWP-1, and for UE-2, these common frequency resources are part of BWP-2. Total sizes of the BWP-1 and BWP-2 are different for UE-1 and UE-2.

In the example of FIG. 8A, the size of BWP is 20 as denoted by 810, FRO=5 as denoted by 811 and $BWP_{SA}$=8 as denoted by 812. The determined common frequency resource (PRB Index) for the multicast traffic is denoted by 813. In the example of FIG. 8B, the size of BWP is 10 as denoted by 820, FRO=1 as denoted by 821 and $BWP_{SA}$=8 as denoted by 822. The determined common frequency resource (PRB Index) for the multicast traffic is denoted by 823.

It can be seen from FIGS. 8A and 8B that despite the total sizes of the BWP-1 and BWP-2 are different for UE-1 and UE-2, both UE-1 and UE-2 are able to successfully identify the appropriate PRBs where the group-common MBS data is scheduled using the assistance information. The bitmap configuration is common for UE-1 and UE-2, and with the assistance information, both UE-1 and UE-2 are able to determine the PRB indexes where the data is expected to be scheduled.

With the process described in FIG. 6, the second device 120 may be configured with an active BWP that satisfies both MBS and unicast requirements, which also means that the second device 120 doesn't need to switch BWPs frequently. The process also could be applied in case of cross-BWP switching for the scheduling of multicast (and possibly unicast) traffic.

In summary, the process described in FIG. 6 can provide significant flexibility to the first device 110 to schedule multicast traffic (for example, MBS PDSCH) by combining the best aspects of dedicated BWP size for the second device 120 and common frequency resources for multicast traffic. Further, the process can provide significant complexity reduction to the second device 120 by enabling simpler blind decoding through predictable DCI sizes, and this makes the group scheduling for a large number of second devices simple and relatively straightforward. In addition, the process is agnostic to the RA type utilized at the first device 110, thereby the scheduling flexibility of multicast traffic data within the PDSCH is further enhanced. Additionally, the process also enables the first device 110 to schedule unicast and multicast traffic for the second device 120 within the same slot by enabling flexible BWP configuration dedicated for the second device 120.

Corresponding to the above process, some example embodiments of the present disclosure will now be described in detail with reference to the figures. However, those skilled in the art would readily appreciate that the detailed description given herein with respect to these figures is for explanatory purpose as the present disclosure extends beyond theses limited embodiments.

Figure 9:
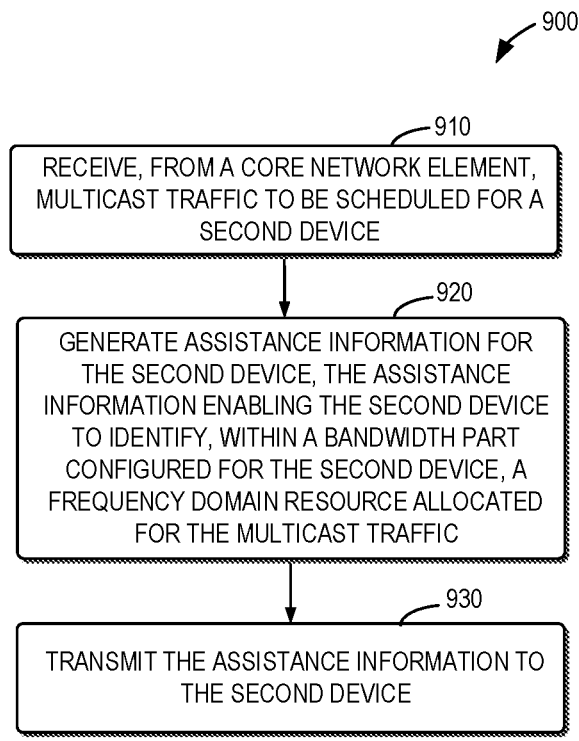
FIG. 9 illustrates a flowchart of a method of communication implemented at a first device according to example embodiments of the present disclosure.

FIG. 9 illustrates a flowchart of a method 900 of communication implemented at a first device according to example embodiments of the present disclosure. The method 900 can be implemented at the first device 110 shown in FIG. 1. For the purpose of discussion, the method 900 will be described with reference to FIG. 1. It is to be understood that method 900 may further include additional blocks not shown and/or omit some shown blocks, and the scope of the present disclosure is not limited in this regard.

As shown in FIG. 9, at block 910, the first device 110 receives, from a core network element, multicast traffic to be scheduled for the second device 120. At block 920, the first device 110 may generate assistance information for the second device 120. The assistance information enables the second device 120 to identify, within a BWP configured for the second device 120, a frequency domain resource allocated for the multicast traffic.

In some embodiments, the assistance information may comprise at least one of the following: an identity of the BWP in which the frequency domain resource is scheduled; an offset indicating a starting location of the frequency domain resource within the BWP; or a parameter for adaptation of a size of a BWP of the multicast traffic relative to a size of the BWP configured for the second device 120. In some embodiments, the assistance information may be associated with an identifier, the identifier being associated with the multicast traffic. For example, the identifier is G-RNTI.

At block 930, the first device 110 may transmit the assistance information to the second device 120. In some embodiments, the first device 110 may generate DCI comprising a field indicating the frequency domain resource, the frequency domain resource being selected from common frequency resources used to schedule the multicast traffic; scramble the DCI with an identifier associated with the multicast traffic; and transmit the scrambled DCI to the second device 120.

The operations in the method of FIG. 9 correspond to that in the process described in FIG. 3, and thus other details are omitted here. With the method of FIG. 9, common frequency resources for multicast traffic can be scheduled in a more flexible way. In addition, scheduling of unicast and multicast traffic within the same slot can be enabled.

Figure 10:
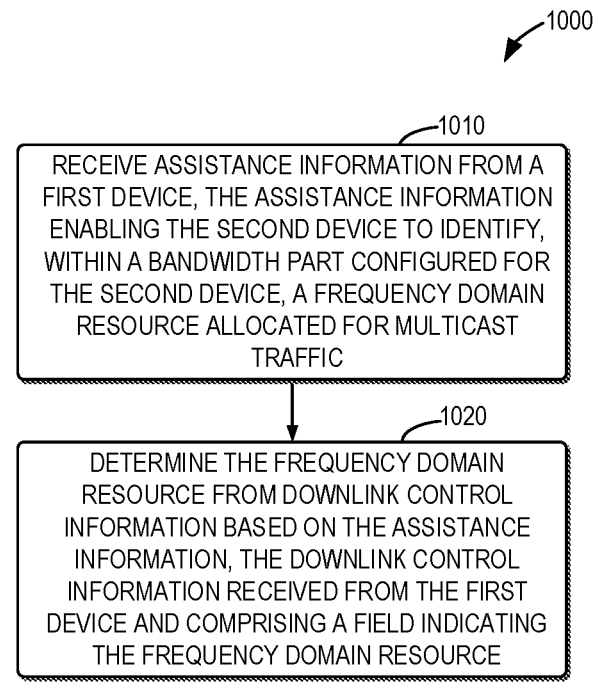
FIG. 10 illustrates a flowchart of a method of communication implemented at a second device according to example embodiments of the present disclosure.

Correspondingly, embodiments of the present disclosure also provide a method of communication implemented at a second device. FIG. 10 illustrates a flowchart of a method 1000 of communication implemented at a second device according to example embodiments of the present disclosure. The method 1000 can be implemented at the second device 120 shown in FIG. 1. For the purpose of discussion, the method 1000 will be described with reference to FIG. 1. It is to be understood that method 1000 may further include additional blocks not shown and/or omit some shown blocks, and the scope of the present disclosure is not limited in this regard.

As shown in FIG. 10, at block 1010, the second device 120 receives assistance information from the first device 110. The assistance information enables the second device 120 to identify, within a BWP configured for the second device 120, a frequency domain resource allocated for multicast traffic. In some embodiments, the assistance information may comprise at least one of the following: an identity of the BWP in which the frequency domain resource is scheduled; an offset indicating a starting location of the frequency domain resource within the BWP; or a parameter for adaptation of a size of a BWP of the multicast traffic relative to a size of the BWP configured for the second device 120. In some embodiments, the assistance information may be associated with an identifier, the identifier being associated with the multicast traffic. For example, the identifier is G-RNTI.

At block 1020, the second device 120 determines the frequency domain resource from DCI based on the assistance information, the DCI received from the first device 110 and comprising a field indicating the frequency domain resource. In some embodiments, the second device 120 may receive, from a downlink control channel, scrambled DCI with an identifier associated with the multicast traffic; and determine the DCI by descrambling the scrambled DCI. An example determination of the frequency domain resource will be detailed below in connection with FIG. 11.

Figure 11:
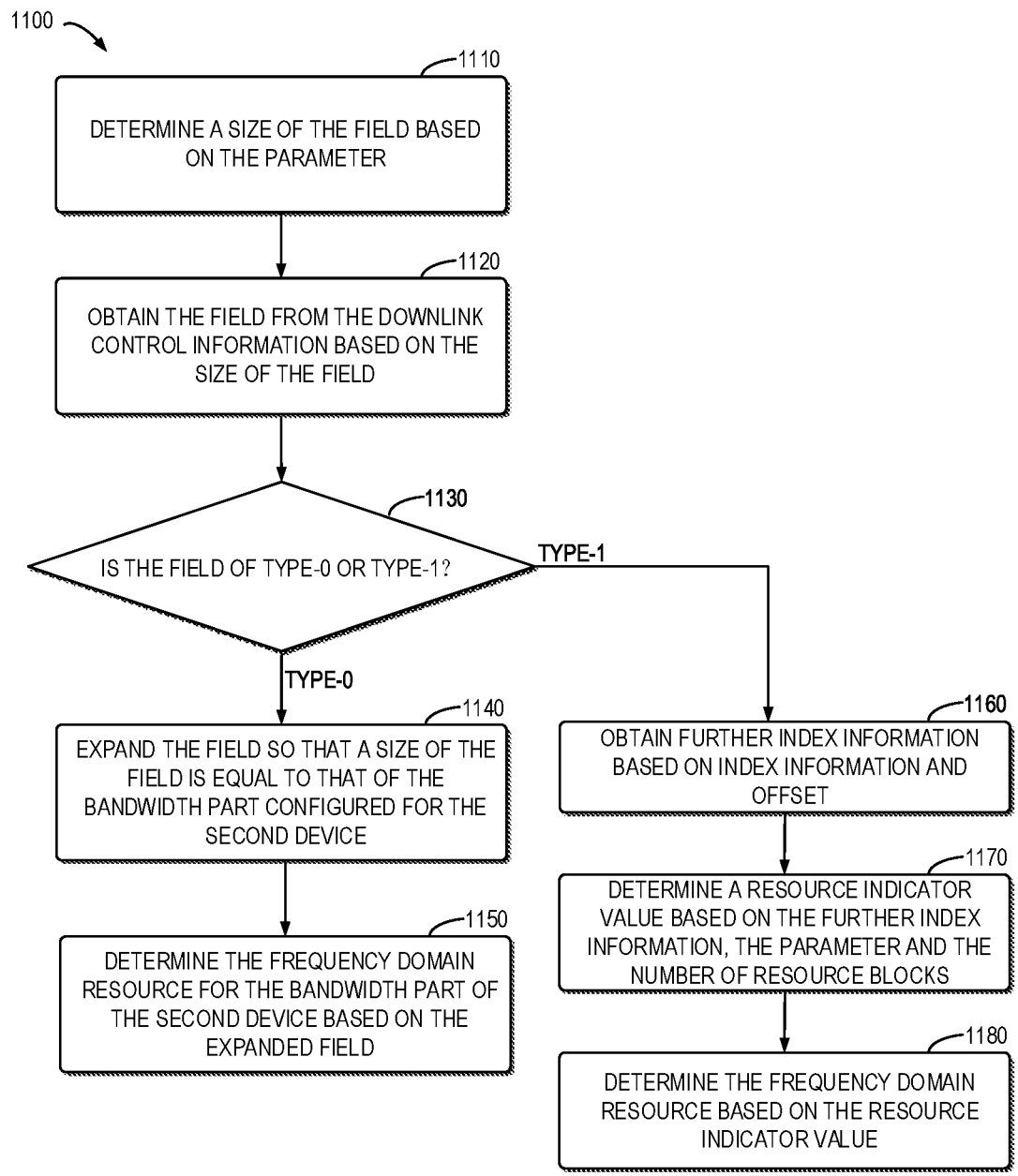
FIG. 11 illustrates a flowchart of a method of determining the frequency domain resource for multicast traffic according to example embodiments of the present disclosure.

FIG. 11 illustrates a flowchart of a method 1100 of determining a frequency domain resource for multicast traffic according to example embodiments of the present disclosure. The method 1100 can be implemented at the second device 120 shown in FIG. 1. For the purpose of discussion, the method 1100 will be described with reference to FIG. 1. It is to be understood that method 1100 may further include additional blocks not shown and/or omit some shown blocks, and the scope of the present disclosure is not limited in this regard.

As shown in FIG. 11, at block 1110, the second device 120 may determine a size of the field based on the parameter. At block 1120, the second device 120 may obtain the field from the DCI based on the size of the field. In this way, blind decoding for DCI can be simplified.

At block 1130, the second device 120 may determine whether the field is of RA Type-0 or Type-1. If determining that the field is of RA Type-0, i.e., the field comprises a bitmap, the process proceeds to block 1140.

At block 1140, the second device 120 may expand the field so that a size of the field is equal to that of the BWP configured for the second device 120 by padding the beginning of the field with a first number of a first bit and padding the ending of the field with a second number of the first bit, the first number being equal to the offset and the first bit indicating that no data is scheduled. At block 1150, the second device 120 may determine the frequency domain resource for the BWP of the second device based on the expanded field.

If determining that the field is of RA Type-1, i.e., the field comprises index information of a starting RB and the number of RBs, the process proceeds to block 1160. At block 1160, the second device 120 may obtain further index information based on the index information and the offset. At block 1170, the second device 120 may determine a RIV based on the further index information, the parameter and the number of RBs. At block 1180, the second device 120 may determine the frequency domain resource based on the RIV.

The operations in the methods of FIG. 10 correspond to that in the process described in FIG. 3, and thus other details are omitted here. With the method of FIG. 10, common frequency resources for multicast traffic can be flexibly identified within dedicated BWP for the second device 120. In addition, simpler blind decoding through predictable DCI sizes can be enabled and complexity at the second device 120 is significantly reduced.

In some embodiments, an apparatus (for example, the first device 110) capable of performing the method 900 may comprise means for performing the respective steps of the method 900. The means may be implemented in any suitable form. For example, the means may be implemented in a circuitry or software module.

In some embodiments, the apparatus may comprise: means for receiving, at a first device and from a core network element, multicast traffic to be scheduled for a second device; means for generating assistance information for the second device, the assistance information enabling the second device to identify, within a bandwidth part configured for the second device, a frequency domain resource allocated for the multicast traffic; and means for transmitting the assistance information to the second device.

In some embodiments, the assistance information may comprise at least one of the following: an identity of the bandwidth part in which the frequency domain resource is scheduled; an offset indicating a starting location of the frequency domain resource within the bandwidth part; or a parameter for adaptation of a size of a bandwidth part of the multicast traffic relative to a size of the bandwidth part configured for the second device.

In some embodiments, the assistance information may be associated with an identifier, the identifier being associated with the multicast traffic.

In some embodiments, the apparatus may further comprise: means for generating downlink control information comprising a field indicating the frequency domain resource, the frequency domain resource being selected from common frequency resources used to schedule the multicast traffic; means for scrambling the downlink control information with an identifier associated with the multicast traffic; and means for transmitting the scrambled downlink control information to the second device.

In some embodiments, an apparatus (for example, the second device 120) capable of performing the method 1000 may comprise means for performing the respective steps of the method 1000. The means may be implemented in any suitable form. For example, the means may be implemented in a circuitry or software module.

In some embodiments, the apparatus may comprise: means for receiving assistance information from a first device, the assistance information enabling the second device to identify, within a bandwidth part configured for the second device, a frequency domain resource allocated for multicast traffic; and means for determining the frequency domain resource from downlink control information based on the assistance information, the downlink control information received from the first device and comprising a field indicating the frequency domain resource.

In some embodiments, the assistance information may comprise at least one of the following: an identity of the bandwidth part in which the frequency domain resource is scheduled; an offset indicating a starting location of the frequency domain resource within the bandwidth part; or a parameter for adaptation of a size of a bandwidth part of the multicast traffic relative to a size of the bandwidth part configured for the second device.

In some embodiments, the assistance information may be associated with an identifier, the identifier being associated with the multicast traffic.

In some embodiments, the apparatus may further comprise: means for receiving, from a downlink control channel, scrambled downlink control information with an identifier associated with the multicast traffic; and means for determining the downlink control information by descrambling the scrambled downlink control information.

In some embodiments, the means for determining may comprise: means for determining a size of the field based on the parameter; means for obtaining the field from the downlink control information based on the size of the field; and means for determining the frequency domain resource based on the field.

In some embodiments, the means for determining may comprise: means for in accordance with a determination that the field comprises a bitmap, expanding the field so that a size of the field is equal to that of the bandwidth part configured for the second device by padding the beginning of the field with a first number of a first bit and padding the ending of the field with a second number of the first bit, the first number being equal to the offset and the first bit indicating that no data is scheduled; and means for determining the frequency domain resource for the bandwidth part of the second device based on the expanded field.

In some embodiments, the means for determining may comprise: means for in accordance with a determination that the field comprises index information of a starting resource block and the number of resource blocks, obtaining further index information based on the index information and the offset; means for determining a resource indicator value based on the further index information, the parameter and the number of resource blocks; and means for determining the frequency domain resource based on the resource indicator value.

Figure 12:
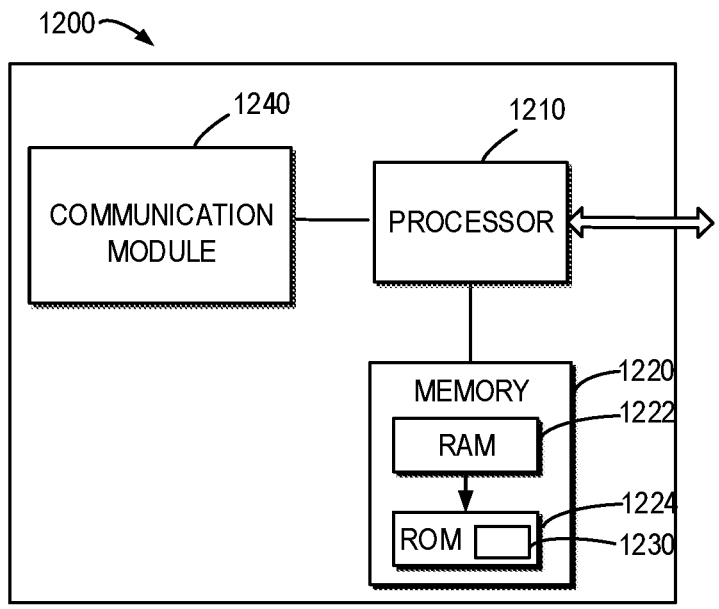
FIG. 12 illustrates a simplified block diagram of an apparatus that is suitable for implementing example embodiments of the present disclosure.

FIG. 12 is a simplified block diagram of a device 1200 that is suitable for implementing embodiments of the present disclosure. The device 1200 may be provided to implement the first device or the second device, for example the first device 110 or the second device 120 as shown in FIG. 1. As shown, the device 1200 includes one or more processors 1210, one or more memories 1220 coupled to the processor 1210, and one or more communication modules 1240 (such as, transmitters and/or receivers) coupled to the processor 1210.

The communication module 1240 is for bidirectional communications. The communication module 1240 has at least one antenna to facilitate communication. The communication interface may represent any interface that is necessary for communication with other network elements.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The program 1230 may be stored in the ROM 1224. The processor 1210 may perform any suitable action and processing by loading the program 1230 into the RAM 1222.

The embodiments of the present disclosure may be implemented by means of the program 1230 so that the device 1200 may perform any process of the disclosure as discussed with reference to FIGS. 1 to 11. The embodiments of the present disclosure may also be implemented by hardware or by a combination of software and hardware.

Figure 13:
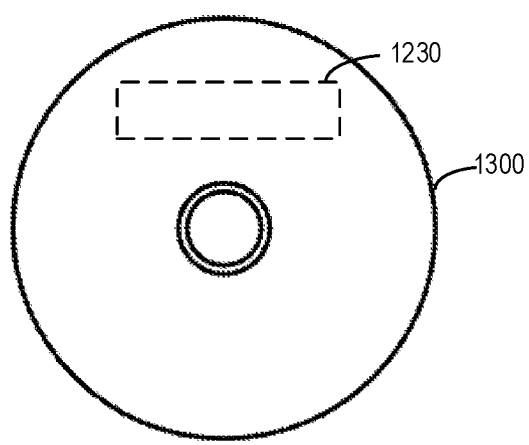
FIG. 13 illustrates a block diagram of an example computer readable medium in accordance with example embodiments of the present disclosure.

In some embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. The computer readable medium may include any types of tangible non-volatile storage, such as ROM, EPROM, a flash memory, a hard disk, CD, DVD, and the like. FIG. 13 shows an example of the computer readable medium 1300 in form of CD or DVD. The computer readable medium has the program 1230 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 900-1100 as described above with reference to FIGS. 9-11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A second device comprising:
   at least one processor; and
   at least one memory including computer program code;
   the at least one memory and the computer program code configured to, with the at least one processor, cause the second device to:
   receive assistance information from a first device, the assistance information enabling the second device to identify, within a bandwidth part configured for the second device, a frequency domain resource allocated for multicast traffic; and
   determine the frequency domain resource from downlink control information based on the assistance information, the downlink control information received from the first device and comprising a field indicating the frequency domain resource,
   wherein the assistance information comprises at least:
   a parameter for adaptation of a size of a bandwidth part of the multicast traffic relative to a size of the bandwidth part configured for the second device, and
   wherein the second device is caused to determine the frequency domain resource by:
   in accordance with a determination that the field comprises index information of a starting resource block and the number of resource blocks, obtaining further index information based on the index information and an offset;

determining a resource indicator value based on the further index information, the parameter and the number of resource blocks; and determining the frequency domain resource based on the resource indicator value.

2. The second device of claim 1, wherein the assistance information is associated with an identifier, the identifier being associated with the multicast traffic.

3. The second device of claim 1, wherein the second device is further caused to:

receive, from a downlink control channel, scrambled downlink control information with an identifier associated with the multicast traffic; and determine the downlink control information by descrambling the scrambled downlink control information.

4. The second device of claim 1, wherein the first device is a network device, and the second device is a terminal device.

5. A method of communication, comprising:

receiving, at a second device, assistance information from a first device, the assistance information enabling the second device to identify, within a bandwidth part configured for the second device, a frequency domain resource allocated for multicast traffic; and determining the frequency domain resource from downlink control information based on the assistance information, the downlink control information received from the first device and comprising a field indicating the frequency domain resource, wherein the assistance information comprises at least:

a parameter for adaptation of a size of a bandwidth part of the multicast traffic relative to a size of the bandwidth part configured for the second device, and wherein determining the frequency domain resource comprises:

in accordance with a determination that the field comprises index information of a starting resource block and the number of resource blocks, obtaining further index information based on the index information and an offset;

determining a resource indicator value based on the further index information, the parameter and the number of resource blocks; and determining the frequency domain resource based on the resource indicator value.

6. The method of claim 5, wherein the assistance information is associated with an identifier, the identifier being associated with the multicast traffic.

7. The method of claim 5, further comprising:

receiving, from a downlink control channel, scrambled downlink control information with an identifier associated with the multicast traffic; and determining the downlink control information by descrambling the scrambled downlink control information.

* * * * *

UNITED STATES PATENT AND TRADEMARK OFFICE
CERTIFICATE OF CORRECTION

| | | |
|---|---|---|
| PATENT NO. | : 12,356,434 B2 | Page 1 of 1 |
| APPLICATION NO. | : 18/247967 | |
| DATED | : July 8, 2025 | |
| INVENTOR(S) | : Athul Prasad et al. | |

It is certified that error appears in the above-identified patent and that said Letters Patent is hereby corrected as shown below:

In the Claims

In Column 20, Line 65, Claim 1, delete "the" preceding "number of resource blocks" and insert --a--, therefor.

In Column 22, Line 9, Claim 5, delete "the" preceding "number of resource blocks" and insert --a--, therefor.

Signed and Sealed this
Twenty-eighth Day of October, 2025

John A. Squires
*Director of the United States Patent and Trademark Office*